Figure 1:
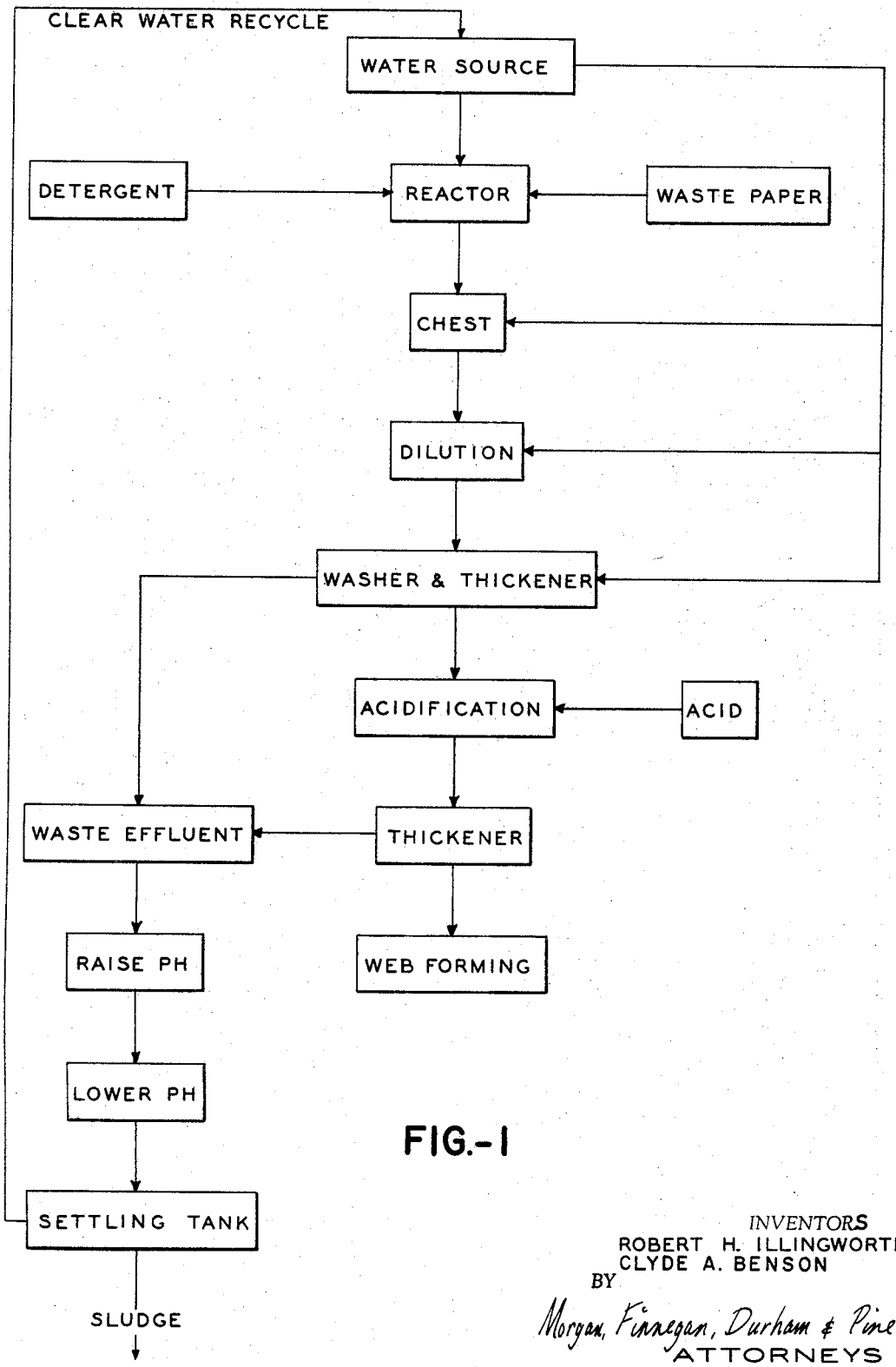

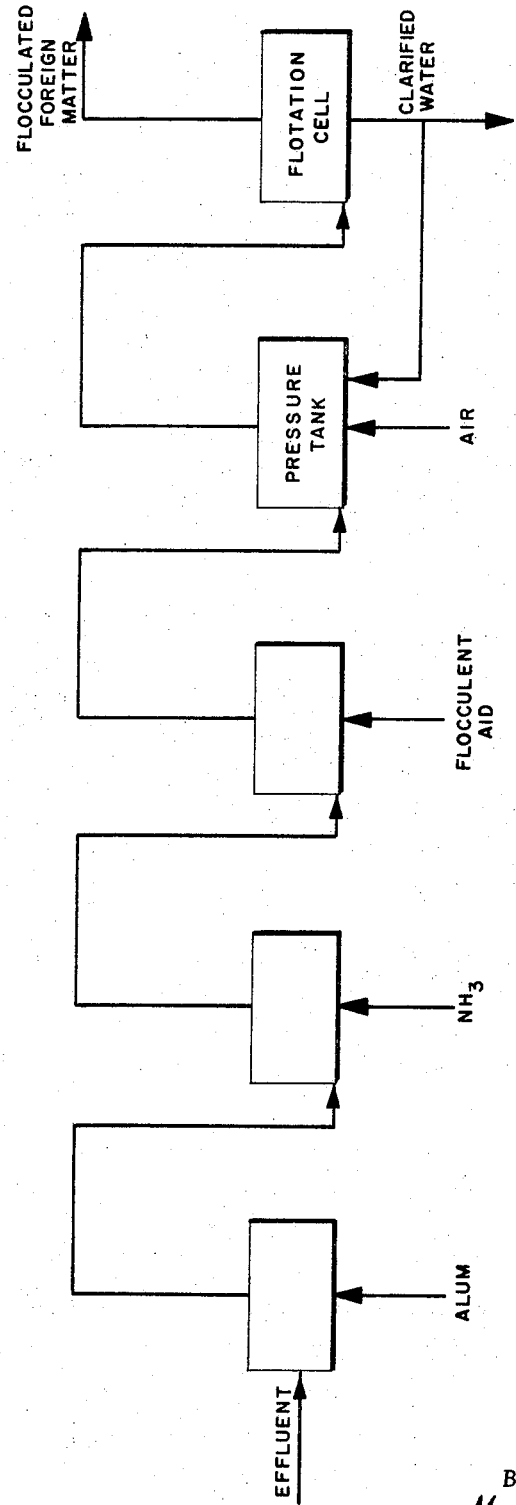

3,354,028
CLARIFYING WASTE EFFLUENTS FROM RE-INKING PROCESSES BY REVERSING THE EFFLUENT pH
Robert H. Illingworth, Madison, and Clyde A. Benson, Old Tappan, N.J., assignors to Garden State Paper Company, Inc., Garfield, N.J., a corporation of New Jersey
Filed Dec. 30, 1963, Ser. No. 334,399
5 Claims. (Cl. 162—5)

This invention relates to processes for de-inking printed paper including clarification of the effluents from such processes.

An average waste paper de-inking plant requires about 15,000 to 35,000 gallons of water per ton of paper handled. Water, in other words, is substantially cost factor in the de-inking industry.

Reclaiming and recycling such vast quantities of water would result in a substantial savings in raw material costs.

Clarification and recycling of the effluent would also solve or substantially eliminate many of the sewerage disposal problems ordinarily associated with paper de-inking plants handling 15,000 to 35,000 gallons of water per ton of paper, thereby leading to further cost savings.

Another significant cost factor in de-inking is the price of the active de-inking agents. Separation of the ink from the effluent without destruction of the active de-inking agents, and retention of the active de-inking agents in the clarified effluent, with subsequent recycle of the effluent, would lead to a considerable saving of de-inking agent.

For these and other reasons, facile and cheap separation of the foreign matter suspended in aqueous de-inking effluents with subsequent recovery of clear water, would be highly advantageous.

It is an object of this invention to provide chemical methods and means for clarifying the aqueous effluents of waste newspaper de-inking plants.

Another object of this invention is to provide methods and means whereby the water requirements of a waste paper de-inking plant can be continuously recycled.

Still another object of this invention is to reduce the sewerage problem ordinarily connected with waste paper de-inking plants.

A further object of this invention is to provide a means whereby at least a portion of the active de-inking agent of a de-inking process may be re-used.

These and other objects of the invention will in part be obvious and will in part be made clear from the ensuing discussion.

According to the present invention it has been discovered that ink may be separated from the effluents under discussion by chemically reversing the effluent pH, as by raising the pH and then lowering of the pH. Conversely, if desired, the pH may first be lowered to the acid range, and then raised. Regulation of the pH as described herein leads to the flocculation of the foreign matter suspended in the effluent. The flocculated foreign matter may then be separated from the effluent to leave a clear water layer.

The suspended foreign matter in the effluents disclosed herein includes both colloidal material and non-colloidal material, e.g., matter having a particle size greater than colloidal size and comprises ink (both ink vehicle and pigment), paper fibers, paper fillers, dust, dirt and other waste solid and liquid material. It is with the flocculation of the foreign matter in the colloidal particle size range (e.g., 1 to 100 millimicrons) that this invention is particularly concerned.

Separation of the flocculated foreign matter is preferably accomplished by sedimentation techniques, e.g., by permitting the treated effluent to stand, thereby causing the flocculated foreign matter to settle out of suspension, leaving a clear water layer that can be fed back or recycled to the main de-inking process, if desired. Any of the batch or continuous thickening or sedimentation techniques of the type described, for example, in Perry, Chemical Engineers' Handbook, 3rd edition, 1950, pp. 937–955, may be used.

Alternatively, air or other gases may be bubbled through the effluent to gasify the flocs produced by the chemical treatment, and the gasified flocs may then be separated from the effluent by conventional techniques, e.g., as by skimming. In this embodiment, the chemically treated effluent is fed to an auxiliary pressure tank maintained under a positive pressure (i.e., above atmospheric) of up to about 60 p.s.i.g., preferably about 15 to 45 p.s.i.g., and usually between 25 and 35 p.s.i.g. Gases such as carbon dioxide, nitrogen, oxygen, helium, neon, krypton, argon, xenon, radon, hydrogen, as well as mixtures of the foregoing, may be used to maintain the pressure in the auxiliary tank.

The flotation cell is open to the atmosphere. When the pressurized effluent from the auxiliary tank is charged to the flotation cell, the air or other gas dissolved therein is released, and quickly rises to the top of the cell. As the released gas rises, it carries the flocculated material with it. The flocculated material therefore accumulates at the top of the flotation cell, and may be skimmed off either continuously or intermittently.

If desired, one or more of the flocculating chemicals may be added directly to the pressure tank, but preferably the chemicals are added prior to the pressure tank.

FIGURE 2 is a flow sheet showing a typical procedure of the type described for the embodiment utilizing the flotation concept.

Care should be used in selecting the chemicals used in pH regulation. At least one of the chemicals should be a coagulant. The term coagulant, as used herein, denotes an agent capable of forming the suspended foreign matter into massive flocs.

For best results, water soluble basic hypochlorite salts, such as alkali and alkaline earth metal hypochlorites, e.g., sodium, potassium and calcium hypochlorite are preferred for raising the effluent pH. Such chemicals have been discovered to give an extremely clean or clear effluent which may best be described as "polished."

For lowering the pH, the preferred acid compound is alum, i.e., aluminum sulfate. Alum of course is also a superior coagulant as that term is used hereinabove.

The amount of chemicals employed will depend to a large extent upon the turbidity of the effluent being treated, the higher the turbidity, the greater the amount of chemicals employed.

Effluents from de-inking processes of the type described herein conventionally have a turbidity of between about 2000 and 5000, and usually in the neighborhood of about 3000, measured by the Jackson candle method. See McGraw-Hill Encyclopedia of Science and Technology, vol. 14, page 146 (1960). Although all turbidities reported herein will be by the Jackson candle method, it should be understood that the reported turbidities are intended to cover equivalent turbidities measured by other methods.

By following the procedures herein, the turbidity of such de-inking plant effluents may be reduced to below 75, and usually to below 30, depending upon the amount of chemicals employed.

With effluents of the type described herein, the amount of the acid compound added will ordinarily vary between about 0.0002 gram-mole/liter and 0.004 gram-mole/liter, on an anhydrous basis, and the amount of base or basic compound between about 0.001 to 0.03 gram-mole/liter, depending upon the degree of clarification desired. For best results, the amount of acid compound will vary between about 0.0006 and 0.003 gram-mole/liter, on an anhydrous basis, and the amount of base between about 0.003 and 0.03 gram-mole/liter.

In the acidification phase of pH regulation, the amount of the acid compound should be sufficient to lower the pH of the effluent to below about 6.5 and preferably to the range 4.0 to 6.5. Following acid addition, enough of the basic compound is added to raise the pH to at least the range 6.5 to 7.5. Amounts of base in excess of that required to raise the pH to the indicated ranges may be used. In general, also, the amount of base will be a stoichiometric excess, based upon the amount of acid compound, or vice versa.

In reversing pH, as that term is used herein, there need not be a complete change from the acid to the alkaline side. Thus, a decrease in pH, e.g., from a high alkaline pH, for instance, 10 to 11, to a low alkaline pH, for instance, 7 to 8, will also be sufficient in many instances to bring about the desired flocculation of the suspended foreign matter.

Reversal of pH, as that phrase is used herein, is intended to mean a change of pH of several pH units, e.g., at least 2 pH units, in one direction, followed by a change of pH of several pH units, e.g., at least 2 pH units, in the opposite direction.

Although the chemicals employed in regulating the pH may be admixed with the effluent in any convenient manner, in general it is desirable to admix in such a way so as to insure a rapid change of pH either to the alkaline or acid side, depending upon the chemical being added.

The methods and chemicals described are generally applicable to effluents from de-inking processes of whatsoever type. The invention however is particularly suitable for clarifying effluents from processes in which the pulp following separation of the ink from the fibers, is recovered from the de-inking solution without prior removal of the ink particles.

Typical of such a de-inking procedure is that described in co-pending application Serial No. 193,448, filed May 9, 1962.

Similarly, the improvements in effluent clarification described herein are primarily applicable to effluents from de-inking processes employing small amounts of detergents or active agents to separate the ink from the fiber, as also described in the identified co-pending application.

The nature of the de-inking process and improvement hereof will be made clear by reference to the accompanying drawing, FIGURE 1, which is a flow sheet of the process.

As shown in FIGURE 1, the waste paper and/or junk, water, and the de-inking chemicals, e.g., detergent, are charged to a pulper, wherein the cellulosic stock is reduced to a pulp and the ink particles separated from the fibers.

The pulp is then dropped to a chest or other suitable reservoir and diluted. Following dilution, the de-inked pulp is washed and thickened in a series of stages. The pulp may be subjected to acidification before entering a final thickening process. Finally, the de-inked and recovered pulp is turned into a web.

The waste effluent from the washing, thickening and web-forming stages is collected at a central location. It is treated with the chemicals as described hereinabove to flocculate the suspended foreign matter, following which it is allowed to settle. The clear water is then recycled to the de-inking stage, and the sludge tapped at periodic intervals.

Alternatively, as already stated, the treated effluent may be gasified, as by introduction of air or an inert gas, and the gasified flocs separated by conventional flotation techniques as by skimming. See FIGURE 2.

Typical de-inking agents which may be used in the main de-inking process include non-ionic, anionic, cationic and ampholytic surface active agents.

For best results in effluent clarification, a non-ionic surfactant should be employed in the de-inking phase of the process.

Preferred non-ionic surface active agents for use are alkyl phenol-ethylene oxide condensation products, such as those represented by the general formula

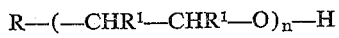

wherein R represents the residue of a suitable alkyl phenol, $R^1$ represents hydrogen or lower alkyl, and $n$ has a value from 2 to 100 or more and usually from about 4 to 30. Compounds of this type are well known in the art. In general, they may be obtained by condensing a polyglycol ether containing the required number of alkenoxy groups or an alkylene oxide such as propylene oxide, butylene oxide, or preferably ethylene oxide, with a suitable alkyl phenol. The amount of alkylene oxide condensed with the alkyl phenol, i.e., the length of the polyoxyalkylene chain, will depend primarily upon the particular compound with which it is condensed. As a convenient rule of thumb, approximately 1 mole of alkylene oxide should be employed for each two carbon atoms in the alkyl phenol. However, the optimum amount of alkylene oxide may readily be determined in any particular case by preliminary test and routine experimentation.

An especially suitable non-ionic detergent is an ethylene oxide adduct of dodecyl phenol having a formula corresponding to that indicated above, wherein $n$ is between and about 8 and 15. Another particularly suitable non-ionic detergent is a condensation product of nonyl-phenol and ethylene oxide having the structural formula

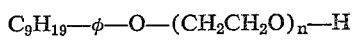

wherein $n$ is an integer between 8 and 15.

Such non-ionic detergents are ordinarily employed alone.

They may also however be used effectively in combination with certain polyols.

Typical polyols are those compounds having more than one hydroxyl (—OH) group, each of which is attached to separate carbon atoms of an aliphatic skeleton. This group includes glycols, glycerol, pentaerythritol, and also such compounds as trimethylolethane, trimethylolpropane, 1,2,6-hexanetriol, sorbitol, inositol, and the like. The dihydric polyols, e.g., the glycols, such as ethylene glycol, diethylene glycol, trimethylene glycol, propylene glycol, dipropylene glycol, and the like, are especially suitable. Of the glycols, ethylene glycol is preferred.

The amount of non-ionic detergent employed should be carefully controlled. Based on the weight of paper, the amount may vary between about 0.1 and 5.0 percent. Especially good results are obtained when between about 1 and 2.5 percent by weight of paper of detergent is employed, and this amount is preferred.

Similar amounts of the polyols may be employed, if desired. Additionally, the polyols may be employed by themselves as the active de-inking agent.

Other detergents which may be used in de-inking processes of the type described in about the amounts specified above include anionic alkyl aryl sulfonates, such as those represented by the formula

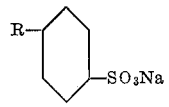

wherein R is an aliphatic radical having 4 to 30 carbon atoms or more. R may be highly branched, as when the propylene tetramer is used as the raw material for the side chain to produce a structure as follows

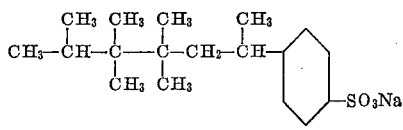

Preferably, however, R is a straight chain hydrocarbon or olefin. Typical of such materials is the 2-isomer of dodecyl benzene sulfonate, which has the following structural formula

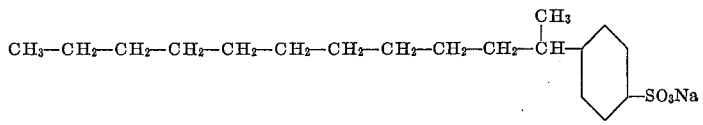

Other surface active agents reportedly used in de-inking include: alcohols; alkyl phenyl ethers of polyethylene glycol; alkyl and polyether sulfated fatty acyl compounds, such as sulfated fatty acyl derivative of 4-amino butanol-2; long chain alkane sulfonates; condensation products of fatty acyl compounds and methyltaurine; and protein detergents of the type described in U.S. Patent 2,015,012. These protein detergents may be described as condensation products of fatty acyl compounds and protein hydrolyzates.

Small effective amounts of such de-inking agents are employed. In general, the amount of the de-inking agent will vary between about 0.1 and 5 percent, based on paper, and preferably between about 1 and 2.5 percent, based on paper.

Best results are achieved with the de-inking solutions described herein when they are alkaline in pH and it therefore is desirable that an alkali be included therein. Although any suitable alkali or alkaline earth metal hydroxide or salt may be employed, the alkali metal hydroxides and salts, such as sodium hydroxide, potassium hydroxide, soda ash, and the like are preferred. Enough of the alkali should be added to maintain the pH of the de-inking solution between about 7.0 and 10, or even higher, and preferably between about 7.1 and 7.5.

In preparing the de-inking solution, water may be charged to the reactor or pulper and the active de-inking agent and other chemicals described hereinabove added. The paper to be de-inked may then be added to the resulting solution. Alternatively, the printed cellulosic material could be sprayed or otherwise treated with the de-inking agents, and then the proper amount of water and other chemicals added.

In general, the percent of cellulosic material by weight of the aqueous de-inking solution should be below 10 percent and usually below 6.0 percent, i.e., between about 4.0 and 6.0 percent. Good results are obtained when the de-inking solution contains about 5 to 5.5 percent by weight of paper and this value appears to be optimum. The scrap is retained in the treating solution until substantial defiberization takes place. Depending upon the degree of agitation in the reactor, the time in the reactor may vary between about 10 and 50 minutes and is usually between about 20 and 40 minutes. The temperature during de-inking may vary anywhere from ordinary room temperature, e.g., 40°–70° F. to about 180° F. or higher. Ordinarily, however, the de-inking will be carried out at mild temperatures, such as between 70° and 120° F.

Following treatment, the defibered material is dropped to a chest or other suitable reservoir, after which it is diluted with water to a solid content of between about 0.5 and 1.5 percent, preferably about 1.0 percent, based upon the solution weight.

Following dilution, the pulp is separated from the solution and washed and thickened by well known methods, as for example by Lancaster washers. The resulting pulp is then acidified to a pH of between about 4 and 6.5, preferably between about 4.5 and 5.5, thickened again and then formed into a web on conventional paper making machinery.

If desired, a bleaching agent may be used following acidification. Ordinarily, however, bleaching is not required. When only acidification is used, the pulp need not be and preferably is not, washed following acidification.

The nature of the invention will be made more clear from the following examples, which are exemplary of the mode of carrying out the de-inking process already described.

EXAMPLE 1

City water is charged to a hydrapulper arranged for batch operation, and equipped with a rotor. Based on the weight of newspaper charge, 2.0 percent of an ethylene oxide adduct of dodecyl phenol is charged to the reactor and the admixture agitated.

To the resulting solution is added about 5 percent by weight, based upon the weight of the solution, of non-shredded, dry newspaper scrap and junk.

Sodium hydroxide is added to raise the pH of the aqueous slurry to about pH 7.5.

Agitation is continued with stirring for about 25 minutes. The pulp is then dropped to a chest, after which it is diluted with water to give a mixture comprising about 1 percent by weight of pulp. The pulp is then thickened and washed by a Lancaster three-stage washer and thickener. The solid content of pulp drawn off the Lancaster machine is about 5.0 percent by weight. The pulp is then acidified to a pH of 5.0 by addition of $SO_2$ gas. Following acidification, the pulp is again thickened and formed into a web.

The pulp has a substantially white appearance and can readily be handled on conventional paper making machines to produce a paper web sheet.

Paper sheets prepared from the pulp following acidification have an average TAPPI. standard brightness of 56 to 58.

The effluent from the various de-inking stages is black in appearance and has a turbidity of about 3000, and a pH of about 7.1 to 7.5. To the resulting effluent is added enough calcium hypochlorite to raise the pH of the effluent to about 10.5. Following thorough agitation, enough alum is added until the pH is reduced to 5.0. Again the effluent is agitated, and then permitted to stand overnight. The remaining clean and clear effluent, which can best be described as "polished," is siphoned off and may be recycled to the de-inking stage if desired.

EXAMPLE 2

The same procedure was followed as in Example 1 except that the detergent used was a water soluble alkyl aryl sulfonate. The pH of the effluent is about 6.8. Enough calcium hypochlorite is added to raise the pH to 9.3. Sufficient alum is then introduced to lower the pH value to 4.6, following which the effluent is allowed to settle. The clear, clean effluent is siphoned off, and may be recycled as in Example 1.

EXAMPLE 3

Example 1 is repeated, with the exception that sodium hydroxide rather than calcium hypochlorite is used to raise the pH of the effluent. Charging of the pH regulating chemicals is accompanied by agitation so as to permit aeration of the effluent. Following settling, the effluent has a slight haze as compared to that of Example 1, but is clear of visible suspended matter and is eminently satisfactory for recycling to the de-inking stage, if desired.

EXAMPLE 4

Example 1 is repeated, with the exception that ammonia gas is used to raise the pH of the effluent. Here again, agitation to permit aeration of the effluent is employed in admixing the pH adjusting chemicals. Results similar to those of Example 3 are achieved.

Although gasification, including cascading, and flotation techniques may be employed utilizing the coagulating chemicals described herein, it should be understood that such sophisticated and costly techniques need not be resorted to, since by utilizing the teachings contained herein, simple sedimentation following flocculation is quite feasible and practical on a commercial scale.

The invention in its broader aspects is not limited to the specific compositions, steps and methods described, but departures may be made therefrom within the scope of the accompanying claims without departing from the principles of the invention and without sacrificing its chief advantages.

What is claimed:

1. In a method of de-inking waste printed cellulosic material by a process which includes pulping the printed material in an aqueous admixture containing between about 0.1 and 5 percent by weight of a non-ionic, alkyl phenol-ethylene oxide condensate, the amount of the printed cellulosic material in the aqueous admixture being less than about 10 percent by weight of the solution, continuing pulping until the ink particles have separated from the cellulosic fiber, diluting the resulting admixture to a solid content of between about 0.1 and 1.5 percent, and removing the resulting pulp from the solution to leave an aqueous effluent, and having foreign matter including ink particles suspended therein, the improvement which comprises treating the effluent sequentially with alum and alkali in amounts sufficient to change the pH of the effluent first in one direction by at least 2 pH units and then in the opposite direction by at least 2 pH units to thereby substantially flocculate the suspended foreign matter, and separating the flocculated foreign matter from the aqueous effluent to obtain a clarified water phase.

2. The method of claim 1 wherein the flocculated foreign matter is separated from the effluent by flotation.

3. In the method of de-inking printed paper by pulping the printed paper in an aqueous solution comprising small amounts of a surface active agent capable of separating the ink from the paper, and removing the resulting pulp from the solution, thereby leaving an effluent containing foreign matter, including ink particles suspended therein, the improvement for clarifying the effluent which comprises chemically treating the effluent containing the suspended foreign matter to flocculate the suspended foreign matter by sequentially adding an alum and a base to change the pH of the effluent first in one direction by at least 2 pH units and then in the opposite direction by at least 2 pH units, flocculating the suspended foreign matter, and separating the resulting flocculated foreign matter to leave clear water containing said surface active agent dissolved therein.

4. The improvement of claim 3 wherein the flocculated foreign matter is separated from the effluent by flotation.

5. The improvement of claim 3 wherein the amount of alum used to treat the effluent varies between about 0.0002 and 0.004 gram-mole per liter, and the amount of alkali is between about 0.001 and 0.03 gram-mole per liter.

References Cited
UNITED STATES PATENTS

| | | | |
|---|---|---|---|
| 2,429,868 | 10/1947 | Campanella | 210—53 |
| 2,762,681 | 9/1956 | Crowley | 210—52 |
| 3,069,307 | 12/1962 | Boaz | 162—5 |
| 3,171,800 | 3/1965 | Rice | 210—52 |

DONALL H. SYLVESTER, *Primary Examiner.*

HOWARD R. CAINE, *Examiner.*